Patented Sept. 1, 1942

2,294,450

UNITED STATES PATENT OFFICE 2,294,450

MANUFACTURE OF ARTIFICIAL FILAMENTS, FOILS, AND SIMILAR MATERIALS

Henry Dreyfus, London, England, assignor to Celanese Corporation of America, a corporation of Delaware No Drawing. Application October 3, 1939, Serial No. 297,682. In Great Britain October 25, 1938

6 Claims. (Cl. 8—129)

This invention relates to improvements in the manufacture of artificial filaments, foils and similar materials and particularly in the manufacture of such artificial materials having a basis of organic derivatives of cellulose.

I have discovered that the properties of artificial filaments, yarns, foils and similar materials having a basis of organic derivatives of cellulose containing free hydroxy groups may be improved by reacting them with reagents containing both esterifying and etherifying radicles, under such conditions that both the radicles react with the hydroxy groups. The treatment may be carried out under such conditions that esterification and etherification is effected simultaneously or the reaction may be effected in stages in either order.

As examples of reagents which may be employed for carrying out the process of the present invention may be mentioned halides of halogenated acids, for example $\alpha$- and $\beta$-chlorpropionyl chlorides, $\alpha$-brom propionyl bromide, $\gamma$-chlorbutyryl chloride and o-chlormethyl benzoyl chloride. Another type of etherifying radicle which may be present is the alkylene oxide radicle in conjunction with a carboxylic acid or carboxylic acid halide group as, for example, in glycidic acid and propylene oxide $\gamma$-carboxylic acid.

In general reagents containing carboxylic acid groups should be employed in the presence of a halogenating agent e. g. phosphorus pentachloride or thionyl chloride.

The reaction is preferably carried out by heating the cellulose derivative materials with the reagent at a relatively low temperature, for example, 40–80° C. The reagent may be employed in solution in a suitable liquid, for example an ether, a hydrocarbon or a halogenated hydrocarbon, which is a non-solvent for the yarns, foils or other articles being treated. The reaction medium may also contain other substances which assist in the reaction. For example, when reagents containing halogen atoms are employed, in which case a hydrohalide acid is usually split off, a base or other substance which will neutralise the hydrohalide acid, for example calcium hydroxide or carbonate or sodium acetate or other salt of a weak acid and strong base, may be present. Again, as stated above, phosphorus pentachloride, thionyl chloride or other halogenating agent may be present.

The reaction may be carried out in a closed apparatus under pressure or in an apparatus fitted with a reflux condenser, in which case the reflux conditions may be such that by-products of the reaction are continuously removed during the reaction. For example, the condenser may be maintained at such a temperature that hydrochloric acid or other hydrohalide acid passes over while the reagent containing the esterifying and etherifying radicles is condensed and falls back into the reaction vessel.

The invention is particularly concerned with the treatment of artificial yarns, foils and similar products made of commercial acetone-soluble cellulose acetate or other organic derivative of cellulose containing a relatively small proportion of free hydroxy groups but it is also applicable to the treatment of such products made of an organic derivative of cellulose containing higher or lower proportions of hydroxy groups. Thus, for example, ordinary commercial cellulose acetate yarn which has been partially saponified may be treated according to the process of the present invention. Examples of other organic derivatives of cellulose are cellulose propionate, cellulose butyrate, ethyl and butyl celluloses, and cellulose derivatives containing hydroxy groups in substituent radicles, e. g. hydroxy ethyl and hydroxy propyl celluloses.

*Example 1*

10 parts by weight of cellulose acetate yarn are heated in a reflux apparatus in a medium having the following composition:

| | Parts by weight |
|---|---|
| Carbon tetrachloride | 500 |
| $\beta$ chlorpropionyl chloride | 10 |
| Pyridine | 10 |

Heating is carried out for about an hour at about 40° C. and the temperature is then gradually raised to boiling point and continued for about 2 hours. The yarns are then removed, well washed and dried.

*Example 2*

10 parts by weight of cellulose acetate yarn are heated in a closed vessel for about 2 hours at 40–50° C. in a medium having the following composition:

| | Parts by weight |
|---|---|
| Glycidic acid | 5 |
| Ether | 500 |
| Thionyl chloride | 7 |

On conclusion of the treatment the yarns are well washed and dried.

Having described my invention, what I desire to secure by Letters Patent is:

1. Process for the treatment of artificial filaments, foils and similar materials containing an organic derivative of cellulose containing free hydroxy groups, which comprises heating the materials with a halide of a halogenated fatty acid in a medium which is a non-solvent for the materials and which contains a halogenating agent selected from the group consisting of phosphorus pentachloride and thionyl chloride, the heating being continued until both the halogen atoms of the halide of the halogenated fatty acid have reacted with the hydroxy groups present in the organic derivative of cellulose.

2. Process for the treatment of artificial filaments, foils and similar materials containing acetone-soluble cellulose acetate, which comprises heating the materials with a halide of a halogenated fatty acid in a medium which is a non-solvent for the materials and which contains a halogenating agent selected from the group consisting of phosphorus pentachloride and thionyl chloride, the heating being continued until both the halogen atoms of the halide of the halogenated fatty acid have reacted with the hydroxy groups present in the cellulose acetate.

3. Process for the treatment of artificial filaments, foils and similar materials containing an organic derivative of cellulose containing free hydroxy groups, which comprises heating the materials in a medium which is a non-solvent therefor and which contains a compound containing an alkylene oxide radicle and a carboxy group in conjunction with a halogenating agent selected from the group consisting of phosphorus pentachloride and thionyl chloride until both the alkylene oxide radicle and the carboxy group have reacted with the hydroxy groups present in the cellulose derivative.

4. Process for the treatment of artificial filaments, foils and similar materials containing acetone-soluble cellulose acetate, which comprises heating the materials in a medium which is a non-solvent therefor and which contains a compound containing an alkylene oxide radicle and a carboxy group in conjunction with halogenating agent selected from the group consisting of phosphorus pentachloride and thionyl chloride until both the alkylene oxide radicle and the carboxy group have reacted with the hydroxy groups present in the cellulose acetate.

5. Process for the treatment of artificial filaments, foils and other materials containing an organic derivative of cellulose containing free hydroxy groups, which comprises heating the materials with a compound containing both an esterifying and an etherifying radicle in a medium which is a non-solvent for the materials and which contains a halogenating agent selected from the group consisting of phosphorus pentachloride and thionyl chloride until both the radicles have reacted with the hydroxy groups present in the organic derivative of cellulose.

6. Process for the treatment of artificial filaments, foils and other materials containing acetone-soluble cellulose acetate, which comprises heating the materials with a compound containing both an esterifying and an etherifying radicle in a medium which is a non-solvent for the materials and which contains a halogenating agent selected from the group consisting of phosphorus pentachloride and thionyl chloride until both the radicles have reacted with the hydroxy groups present in the cellulose acetate.

HENRY DREYFUS.